United States Patent Office 3,382,283
Patented May 7, 1968

3,382,283
METHOD FOR ALKYLATING PHENOLIC COMPOUNDS
Claude Laurent Zundel, 12 Ave. de Bretteville, Neuilly-sur-Seine, France, and Lucien Choron, 14 Rue Rieux, Boulogne-sur-Seine, France
No Drawing. Filed Oct. 5, 1964, Ser. No. 401,727
Claims priority, application France, Oct. 22, 1963, 951,440; Italy, Feb. 1, 1964, 1,889/64, Patent 670,052
5 Claims. (Cl. 260—609)

ABSTRACT OF THE DISCLOSURE

A method for preparing alkylated aromatic phenolic-type compounds which comprises the steps of placing a mixture of (1) an aromatic phenolic-type compound and (2) a conventional alkylation catalyst in a reaction zone, heating said mixture in said zone to a temperature between about 50° C. and 150° C. under substantially atmospheric pressure, injecting into said heated mixture a liquid olefin having from two to seven carbon atoms and a boiling point at atmospheric pressure lower than the said temperature of said heated mixture, at a rate whereby said liquid olefin is practically instantaneously vaporized, maintaining said heated mixture substantially at said temperature and at substantially atmospheric pressure for a time sufficient to alkylate said aromatic phenolic-type compound, and recovering said alkylated aromatic phenolic-type compound.

This invention relates to a method more particularly to the alkylation of phenols or homologues thereof by reaction with an olefin such as isobutylene, 1-butene or 2-butene.

It is known that compounds with aromatic nuclei such as phenols, cresols, xylenols, aromatic acid or amines, etc., can be alkylated by reacting said compounds with an alkylating agent in the presence of a catalyst such as sulphuric acid. The said aromatic compounds are generally in the solid or liquid form, whereas the alkylating agents, which usually are of lower molecular weight, are chosen among aliphatic hydrocarbons such as olefins, for example ethylene, propylene, 1-butene, 2-butene, isobutylene, 1-pentene, 2-pentene, 1-hexene, 2-hexene, 3-hexene, 2-ethyl-1-pentene and the like.

Alkylation is normally carried out in reactors to which the substance which it is desired to alkylate and the alkylation agent are added together with a catalyst. Usually temperatures higher than 70–80° C. are necessary to obtain adequate reaction speeds.

Two known methods of alkylation have been shown and used heretofore in normal practice. The first consists in using the alkylation agent in its gaseous form, which is the case with olefins containing less than four carbon atoms, and in bubbling said gaseous alkylating agent through the liquid compound which it to be alkylated; as the reaction is an exothermic reaction it is necessary to stir very thoroughly and to cool vigorously to avoid too high a rise in temperature and allow the exothermic process of the reaction to be controlled. With such a method the reaction takes quite a long time and heavy losses of the alkylating agent also occur, said agent polymerising in the presence of the alkylation catalyst. The reaction is difficult to control especially as far as stabilizing the temperature is concerned; most of the time a mixture of complex alkyl products is obtained from which it is difficult to isolate the main desired component in its pure state.

In the second known process the operation is carried out in liquid phase using autoclaves capable of withstanding high pressures, and this entails very cumbersome equipment, especially when large capacities are required. The compound to be alkylated and the alkylating agent in liquid form are placed in the vessel and the temperature is raised until the reaction temperature is reached. The pressure rises and may quickly reach 10 to 15 kg./cm.$^2$; the reaction is completed when the pressure decreases and reaches a predetermined value; the alkylating agent remains liquid during the while of the reaction due to the pressure in the apparatus.

In the two known methods briefly outlined hereabove the conversion yield is not more than 85% of the theory; partial polymerisation of the alkylating agent is frequent and often reaches 10 to 20% or more, to the detriment of the manufacturing costs of the alkylated product being produced. Purification of the desired alkylated product requires a distillation followed by a crystallisation, and even sometimes a recrystallisation, which entails losses of the solvent and of the product.

An object of the present invention is to provide a method of alkylation of aromatic compounds overcoming the above stated difficulties attached to known methods by the use of a simple equipment which does not take up much space.

A further object is to provide such a method of alkylation which makes it possible to achieve conversion yields often higher than 90%.

A still further object is the provision of a method in which polymers of the alkylating agent are not formed due to the rapidity of the reaction.

Another object is to provide a method which is very easy to control and presents no risks to the operators.

These and other objects will be made fully apparent hereinafter.

According to the invention the process of alkylating aromatic compounds by olefins in the presence of a catalyst consists essentially in adding an olefin in the liquid state to a mixture of the catalyst and the aromatic compound placed in a reactor at a moderately high temperature, preferably between 50 and 150° C., and at about atmospheric pressure. The liquid olefin should have a boiling point at atmospheric pressure which is lower than the temperature of the reactor, this latter temperature being controlled and maintained practically constant by means of water circulating in a water-jacket of the reactor for example.

The alkylating agents which are preferably used in this invention are olefins with a maximum of 5 carbon atoms, which have relatively low boiling points, since the temperature in the reactor, which is generally of the order of 60–75° C. or somewhat higher, represents an upper limit for the boiling point of said olefins. The olefins up to C$_5$ used in the invention are all gaseous at such temperatures and at normal pressure. Among the olefins available, such as ethylene, propylene, 1-butene, 2-butene, isobutylene, 1-pentene, 2-methyl-butene, 3-methyl-butene, trimethylethylene, use will preferably be made of those which do not have too high a boiling point and are easy to manipulate in the liquid state, more particularly propylene, 1-butene or 2-butene, and isobutylene.

However, use may also be made of higher olefins, such as 1-hexene, 2-hexene, 3-hexene, 2-ethyl-1-pentene and cyclohexene, which have higher boiling points and for which the temperature in the reactor should reach as high as 150° C., the minimum temperature being about 100° C. and preferably 120° C. Exceptionally, 2-pentene which is a C$_5$ olefin falls within this category.

Typical examples of aromatic compounds which may be alkylated according to the invention include: phenol, orthometa-paracresol, xylenols, ethyl-phenols, phenetole, anisole, nitro- and chlorophenols, resorcinol, catechol, hydroquinone, carvacrol, thymol, naphthols, thiophenols, phenylphenols, bisphenols, monotertiary butylphenols thereof accepting a second molecule of isobutylene.

Any alkylating catalyst may be used in the reaction according to the invention. Examples of such catalysts are sulfuric acid, which is generally preferred, sulfonic, sulfamic, hydrofluoric and phosphoric acids, boron fluoride, fluorinated complexes, aluminum which may be used as metal, aluminum fluorides or aluminum phenoxide, zinc, magnesium, sodium, di-sec.-butyl sulfate, cationic resins, activated montmorillonites and the like, and generally speaking any catalysts including a high H+ ion concentration.

The advantages of the invention can easily be understood if a comparison is made between the use of a particular olefin, to wit isobutylene, as an example, in the alkylation method according to the invention on the one hand and the known methods on the other. Isobutylene (theoretical boiling point —6° C.) is a gas which may be liquified at a low pressure up to 8–10° C. If alkylation is carried out by bubbling the gaseous olefin through the reaction mixture at 60–75° C. a superheater must be provided to vaporize the isobutylene, or an auxiliary pressure of nitrogen must be used, but this has the disadvantage of diluting the reaction gas. If the method is carried out in the liquid phase, the alkylation being operated under pressure, a pumping system for the liquified gas must be used, as well as very important safety devices and expensive apparatus.

According to the invention, on the other hand, the olefin, in the present case isobutylene, is used in its liquid state which is due solely to the pressure in the apparatus in which the isobutylene is stored. The reactor into which isobutylene is introduced is a completely standard apparatus, normally designed to resist only to atmospheric pressure, or to a slightly higher pressure, 2 atm. for example.

The endothermic vaporisation of the liquid olefin by contact with the hot mass of the reactives compensates for the greater part of the exothermy of the alkylation reaction, the control of the reaction thus being made much easier, a substantially constant reaction temperature being readily established and maintained, contrasting with the saw-teeth aspect of the temperature control curve in previously known methods. Furthermore, the reaction is instantaneous and the olefin thus does not have time to be polymerised. The conversion rate is extremely high and very much greater than that obtained with the two conventional methods.

Although the invention should not be limited by theoretical considerations, it can, however, be supposed that apart from the heat compensation, the vaporisation per se leads to an intensive agitation which promotes contact between molecules of the various components taking part in the alkylation reaction, and avoids local overheating leading to polymerisation.

The substantially complete absence of polymerisates makes it much easier to separate the catalyst from the alkylated product at the end of the reaction. In the case of the conventional methods, the polymerisates which are formed and are themselves soluble in the reaction products, dissolve an important fraction of most of the catalysts employed, more particularly sulfuric acid which is the preferred catalyst. The said dissolution leads to the necessity of neutralizing the reaction products and of proceeding with repeated washings to obtain the desired final neutrality. This entails high consumptions of sodium hydroxide and losses of the product due to dissolving of said product in the washing water, which always occurs even if only in minor quantities.

When operating according to the invention, due to the absence of polymers no such dissolving of the catalyst occurs, and said catalyst may be immediately decanted and 99.5% thereof may be eliminated without further processing. As a matter of precaution, about 0.15 part per thousand, by weight, of sodium hydroxide may be added to the reaction product after decantation of the catalyst. Such a result is of considerable importance from the point of view economy and rapidity of operation.

Owing to this intensive reactivity, which is strictly localised at the spot where the liquid olefin spurts into the hot mass of the product during alkylation the residual pressure of gas which establishes is not higher than a few hundred grams/sq. cm. and there is therefor no risk of explosion. It is therefore possible to use an economical apparatus of a capacity which will easily allow very large quantities of reactives to be treated in one operation, and in half or a third of the time required for alkylation carried out by bubbling the alkylating agent. For this reason the process can also be operated in a continuous manner.

The following nonlimitative examples are illustrative of the method of the invention.

Example 1

1600 kg. paracresol were placed with a suitable catalyst (generally sulphuric acid at about 66° Bé.) in a double walled reactor of 4,000 liters capacity equipped with a stirrer, and the temperature of the mixture was raised to 60° C. To the lower part of the reactor was connected an inlet pipe for isobutylene stored in the liquid state under pressure in suitable tanks. The liquid isobutylene injected vaporised instantaneously in the hot mass of paracresol at atmospheric pressure; the injection lasted for a maximum of four to five hours. The alkylation reaction temperature could be easily controlled and maintained at about 60° C. by slight water circulation in the reactor jacket. A total of about 2,000 kg. of isobutylene was thus introduced.

The chromatographic analysis of the product obtained, after decantation of the catalyst, addition of 0.6 kg. of sodium hydroxide and elimination of the volatile fractions was as follows:

| | Percent |
|---|---|
| Mono-tert.-butyl-paracresol | 3.8 |
| Di-tert.-butyl-paracresol | 96 |
| Other impurities | 0.2 |

Di-tert.-butyl-paracresol can be crystallised in its weight of alcohol at a degree of purity analytically higher than 99%. The crystallisation mother-waters, after the alcohol has been eliminated, may be used again directly in place of a fraction of the initial paracresol, without disturbing the reaction, the final result or the quality of the product obtained, which it is not necessary to recrystallise a second time.

Example 2

The same process as in Example 1 was repeated, using mono-tert.-butyl-paracresol as starting material. Di-tert.-butyl-paracresol was obtained quantitatively.

Example 3

2,000 kg. of a xylenol cut corresponding to a mixture of 2,4-dimethylphenol and 2,5-dimethylphenol were placed in the same reactor as that used as in Example 1. Boron fluoride was added as a catalyst and the operation was carried out in the same manner as in Example 1, a total of 850 kg. of liquid isobutylene being introduced within a maximum of 2 hours.

Chromatographic analysis showed that the 2,4-dimethylphenol had been completely alkylated while the 2,5-dimethylphenol, which is less reactive, had been 50% alkylated.

2,4-dimethyl-6-tert.-butylphenol was isolated by distillation.

Example 4

The same reactor as in Example 1 was loaded with 1,000 kg. of phenol whereafter sulfuric acid was added as a catalyst and the operation was carried out in the same manner as in Example 1, a total of 1,600 kg. of liquid isobutylene being introduced in 4 or 5 hours.

Chromatographic analysis showed that all the phenol was alkylated; according to the catalyst used and the reaction time 2-, 3-, 4-mono-tertiary-butyl-phenol 2,4- or 2,6-di-tert.-butyl-phenol, or 2,4,6 tri-tert.-butyl-phenol were obtained in variable proportions, but never any derivative of the octyl-phenol or dodecyl-phenol types resulting from the reaction of isobutylene polymers on the phenol.

Example 5

The same process as in Example 3 was repeated with thiophenol as starting material, trimethylethylene being used as alkylating agent. Tert.-amyl-thiophenol was obtained.

Example 6

1,000 kg. of catechol and 12 kg. of aluminum phenoxide prepared extemporaneously were introduced in the same reactor as in Example 1. The temperature of the mass was raised to 60° C. and 650 kg. of liquid propylene were injected therein in 3 hours. A mixture of 2-isopropyl-catechol and 3-isopropyl-catechol was obtained. No polymers of propylene were found in the reaction product.

Example 7

Always operating in the same conditions as in Example 1, phenol was fed to the reactor, 10% by weight of phosphoric acid were added as a catalyst, and the temperature of the mass was raised to 150° C. A quantity of liquid cyclohexene equal by weight to that of the phenol present in the reactor was then injected therein at a rate of about 300 kg. per hour. Monocyclohexylphenol was substantially quantitatively obtained.

Example 8

The procedure of Example 7 was repeated, using 2-chlorophenol and 2-pentene as alkylating agent; paraisoamyl-2-chlorophenol was obtained in the same conditions.

Example 9

The procedure of Example 7 was repeated, using chlorophenol and 2-ethyl-1-pentene as alkylating agent; parisoheptyl-2-chlorophenol was obtained in the same conditions.

Example 10

A 50% solution of bisphenol A (diphenylolpropane) in xylene was fed to the reactor of Example 1, and 5% by weight of sulfuric acid was added thereto as a catalyst. The temperature of the mass was raised to 70° C. whereafter 125% liquid isobutylene by weight of the bisphenol solution was slowly injected therein. A solution of tetra-tert.-butyl diphenylolpropane was obtained.

In the example, the quantity of isobutylene injected was substantially higher than that corresponding to the final product, owing to the presence of the solvent.

It will be understood that the invention is not limited to the use of special alkylating agents or aromatic compounds, and that without departing from the scope of the invention it is possible to make use of any alkylating agent as long as said agent is introduced in a liquid state into the aromatic compound at a pressure substantially equal to atmospheric pressure, provided the boiling point of the alkylating agent at said pressure is lower than the temperature of the alkylation reaction.

What we claim is:

1. A method for preparing alkylated aromatic phenolic compounds by reaction with an olefin in the presence of an alkylation catalyst which comprises the steps of placing a mixture of (1) an aromatic phenolic-type compound selected from the group consisting of phenol, cresols, xylenols, ethylphenols, phenetole, anisole, nitrophenols, chlorophenols, resorcinol, catechol, hydroquinone, carvacrol, thymol, naphthols, thiophenols, phenylphenols, bisphenols, diphenylolpropane, and monotertiary butyl derivatives thereof which will accept a second isobutylene substituent, and (2) an alkylation catalyst, in a reaction zone, heating said mixture in said zone to a temperature between about 50° C. and 150° C. under substantially atmospheric pressure, injecting into said heated mixture a liquid olefin having two to seven carbon atoms and a boiling point at atmospheric pressure lower than the said temperature of said heated mixture, at a rate whereby said liquid olefin is practically instantaneously vaporized, maintaining said heated mixture substantially at said temperature and at substantially atmospheric pressure for a time sufficient to alkylate said aromatic phenolic compound, and recovering said alkylated aromatic phenolic compound.

2. The method of claim 1 wherein said mixture is heated to a temperature between about 60° C. and 75° C.

3. The method of claim 1 wherein said liquid olefin is isobutylene.

4. The method of claim 1 wherein said alkylation catalyst has a high $H^+$ ion concentration.

5. The method of claim 4 wherein said alkylation catalyst having a high $H^+$ ion concentration is selected from the group consisting of sulfuric acid, sulfonic acid, sulfamic acid, hydrofluoric acid, phosphoric acid, boron trifluoride, fluorinated complexes, aluminum, aluminum fluorides, aluminum phenoxide, zinc, magnesium, sodium, di-sec.-butyl sulfate, cationic resins and activated montmorillonites.

References Cited

UNITED STATES PATENTS

| | | | |
|---|---|---|---|
| 2,147,256 | 2/1939 | Ipatieff et al. | 260—624 |
| 2,560,666 | 7/1951 | Stevens et al. | 260—624 |
| 3,080,438 | 3/1963 | Sailors | 260—683.48 |

OTHER REFERENCES

Voicu et al., Chem. Abst., vol. 54, p. 19556 (1960).

CHARLES B. PARKER, *Primary Examiner.*

D. R. PHILLIPS, *Assistant Examiner.*